United States Patent
Gu et al.

(10) Patent No.: US 9,013,407 B2
(45) Date of Patent: Apr. 21, 2015

(54) POWER-SAVING SENSING MODULE FOR OPTICAL MOUSE AND POWER-SAVING SENSING METHOD

(71) Applicant: PixArt Imaging Inc., Hsinchu County (TW)

(72) Inventors: Ren-Hau Gu, Hsinchu County (TW); Ming-Tsan Kao, Hsinchu County (TW); Sen-Huang Huang, Hsinchu County (TW)

(73) Assignee: PixArt Imaging Inc., Hsinchu County (TW)

( * ) Notice: Subject to any disclaimer, the term of this patent is extended or adjusted under 35 U.S.C. 154(b) by 330 days.

(21) Appl. No.: 13/665,808

(22) Filed: Oct. 31, 2012

(65) Prior Publication Data

US 2013/0300663 A1    Nov. 14, 2013

(30) Foreign Application Priority Data

May 11, 2012    (TW) .............................. 101116947 A

(51) Int. Cl.
*G09G 5/08*    (2006.01)
*G06F 3/033*    (2013.01)
(52) U.S. Cl.
CPC ...................... *G06F 3/033* (2013.01)
(58) Field of Classification Search
CPC ........................................................ G09G 5/08
USPC ......... 345/156, 163, 165, 166, 173, 174, 175; 178/18.01, 18.03, 18.09
See application file for complete search history.

(56) References Cited

U.S. PATENT DOCUMENTS

| | | | | |
|---|---|---|---|---|
| 2003/0006965 A1* | 1/2003 | Bohn | ............................. | 345/163 |
| 2008/0100576 A1* | 5/2008 | Sutardja | ........................ | 345/164 |
| 2010/0123655 A1* | 5/2010 | Lai | ................. | 345/156 |
| 2011/0316799 A1* | 12/2011 | Lee et al. | ....................... | 345/173 |
| 2013/0113705 A1* | 5/2013 | Gu et al. | ....................... | 345/166 |

* cited by examiner

*Primary Examiner* — Pegeman Karimi
(74) *Attorney, Agent, or Firm* — Tim Tingkang Xia, Esq.; Morris, Manning & Martin, LLP

(57) ABSTRACT

A power-saving sensing module includes a light source, first and second sensors, first and second detection units, and a controller. The first sensor detects a first image corresponding to a working plane in response to at least a part of the light ray from the light source to generate a first sensing signal. The first detection unit generates a displacement signal in response to the first sensing signal. The second sensor detects a second image corresponding to an object in response to at least a part of light ray to generate a second sensing signal. The second detection unit generates a touch signal corresponding to the object in response to the second sensing signal. The controller outputs a control signal in response to the touch signal. The first detection unit operates at a dormant state or a sensing state in response to the control signal.

17 Claims, 2 Drawing Sheets

POWER-SAVING SENSING MODULE FOR OPTICAL MOUSE AND POWER-SAVING SENSING METHOD

CROSS-REFERENCE TO RELATED APPLICATIONS

This non-provisional application claims priority under 35 U.S.C. §119(a) on Patent Application No(s). 101116947 filed in Taiwan, R.O.C. on May 11, 2012, the entire contents of which are hereby incorporated by reference.

BACKGROUND OF THE INVENTION

1. Technical Field

The disclosure relates to a power-saving sensing module, more particularly to a sensing module which can sense the touch signal to determine whether to enter the power-saving mode.

2. Related Art

Computer has become more and more important for people's daily life. Not merely as a word processing or computing tool, computer also provides entertainment functions as video and game player. Mouse as an interface of computer improves greatly with computer's function enhancement. The conventional sensing technology applied by a mouse utilizes roller, wheel, and light-emitting diode, and now a mouse may further comprise a laser light source emitting coherent light. Functions of a mouse have extended from cursor control to image zooming, finger identification, and so on. As a result, users can control a computer more conveniently.

Optical mouse as main stream of current mouse can be classified into wired mouse and wireless mouse. Optical mouse with multiple buttons or a single button consumes different electricity quantity. Optical mouse is power supplied by its internal batteries. Generally, optical mouse is designed with a power-saving function because the electricity quantity provided by batteries is very limited.

Optical mouse makes use of image sensor to sense a displacement signal. If the sensor does not sense a displacement signal or the sensed image differential is smaller than a certain threshold value, the mouse will enter the power-saving mode.

However, when the sensed image noise is too big, the sensed displacement signal will not be correct. On the other hand, the image noise may cause the sensed image differential to be too big and thus the mouse cannot enter the power-saving mode.

In addition, when a mouse enters the power-saving mode, a certain time period is needed to determine whether a user continues to operate the mouse. In this time period, the image sensor will detect whether there is a displacement signal and as a result electricity power is consumed. Therefore, if the time period of electricity consume is reduced, power-saving effect can be improved. Furthermore, mouse in power-saving mode also needs a long exposure time which further increases the electricity consume.

SUMMARY OF THE INVENTION

In one aspect, a power-saving sensing module for an optical mouse is disclosed. The optical mouse has an upper surface and a lower surface. The power-saving module comprises a light source for providing a light ray, a first sensor for detecting a first image corresponding to a working plane in response to at least a part of the light ray to generate a first sensing signal, a first detection unit for generating a displacement signal in response to the first sensing signal, a second sensor for detecting a second image corresponding to an object in response to at least a part of the light ray to generate a second sensing signal, a second detection unit for generating a touch signal corresponding to the object in response to the second sensing signal, and a control unit for outputting a control signal in response to the touch signal of the second detection unit, so that the first detection unit operates at a dormant state or a sensing state in response to the control signal. The optical mouse operates on the working plane, and the lower surface of the optical mouse faces to the working plane.

In another aspect, a power-saving sensing method for an optical mouse is disclosed. The method comprises periodically turning on or turning off a light source to make the light source generate a light ray, detecting a first image corresponding to a working plane in response to at least a part of the light ray to generate a first sensing signal, generating a displacement signal in response to the first sensing signal, detecting a second image corresponding to an object in response to at least a part of the light ray to generate a second sensing signal, generating a touch signal corresponding to the object in response to the second sensing signal, and outputting a control signal in response to the touch signal to enable or disable generating the displacement signal.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

Figure 1:
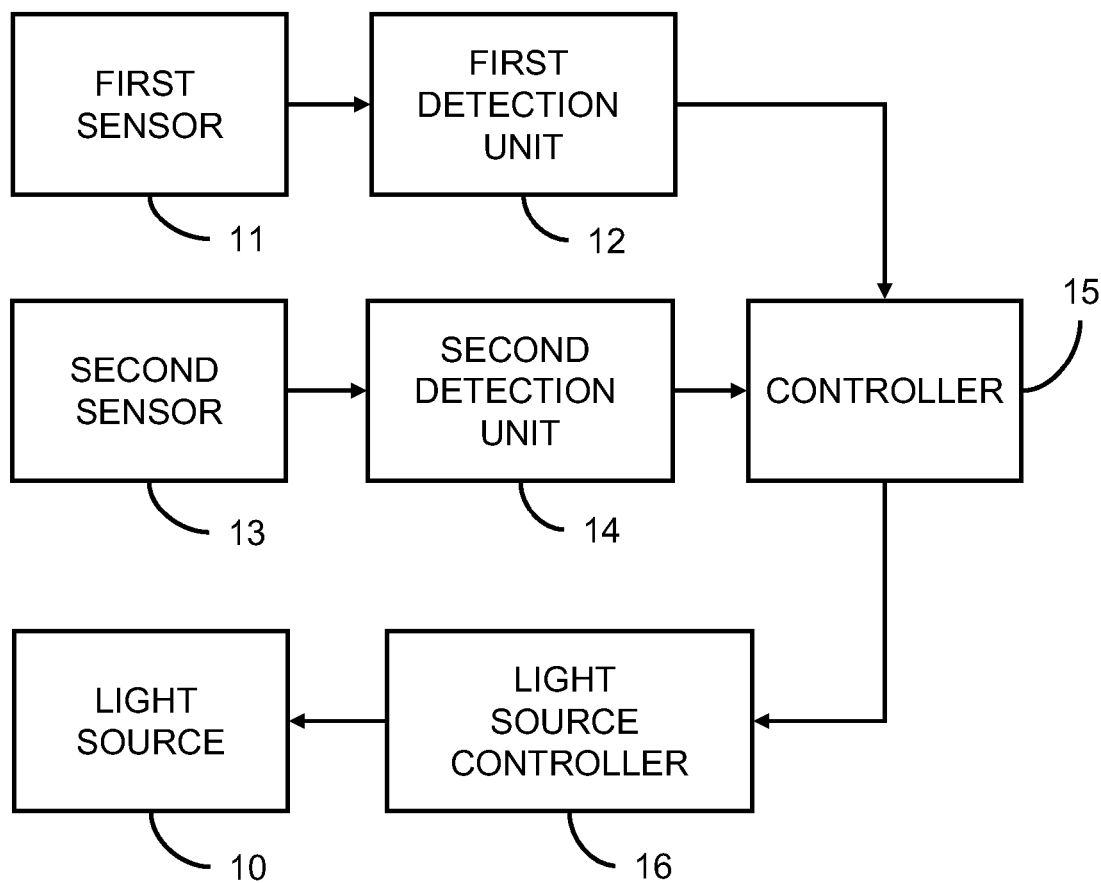
FIG. 1 is a system block diagram of a power-saving sensing module for an optical mouse according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

FIG. 1 is a system block diagram of a power-saving sensing module for an optical mouse according to an embodiment of the disclosure. The sensing module of this embodiment comprises a light source 10, a first sensor 11, a first detection unit 12, a second sensor 13, a second detection unit 14, and a controller 15.

The light source 10 provides a light ray to the first and second sensors 11 and 13 for sensing. When the sensing module is used in the optical mouse, the light source 10 generally is a point light source. The light source may be a light-emitting diode or a laser diode. In another embodiment, the sensing module further comprises a light source controller 16 which is configured to periodically control turning on or turning off of the light source 10.

Generally, an optical mouse has an upper surface and a lower surface. The optical mouse is often operated on a working plane. The lower surface of the mouse is facing to the working plane. The upper surface of the optical mouse is a surface for an object's operation.

The first sensor 11 is used to detect a first image corresponding to a working plane in response to at least a part of the light ray provided from the light source 10 so as to generate a first sensing signal. The first detection unit 12 is connected to the first sensor 11 and is used to generate a displacement signal in response to the first sensing signal generated by the first sensor 11. In an embodiment, the first sensor 11 is an image sensor, for example, a Complementary Metal-Oxide-Semiconductor (CMOS) image sensor. The displacement signal is used to generate the displacement of the mouse cursor.

The second sensor 13 is used to detect a second image corresponding to an object in response to at least a part of the light ray provided from the light source 10 so as to generate a second sensing signal. The second detection unit 14 is connected to the second sensor 13 and is used to generate a touch signal corresponding to the object in response to the second sensing signal generated by the second sensor 13. The touch signal is used to determine whether the first sensor 11 and the first detection unit 12 enter the operation state or power-saving state. In an embodiment, the second sensor 13 may be an image sensor, for example, a CMOS image sensor. More particularly, the second sensor 13 is used to detect how a user contacts with the optical mouse. That is, the second sensor 13 detects light reflected from the user. For example, the light is reflected from the palm or finger of a user's hand operating the optical mouse. As a result, the second sensor 13 may obtain the image information for determining whether a user is contacting with the optical mouse.

Furthermore, the first sensor 11 and the second sensor 13 may be disposed at positions which match with the internal structure of the optical mouse. Based on appropriate optical structure of the optical mouse, such as lens and/or light-guiding elements, the light reflected from the working plane and the user may be respectively guided to the first sensor 11 and the second sensor 13.

In an embodiment, the first detection unit generates the displacement signal according to a feature value of the first sensing signal. In another embodiment, the first detection unit generates the displacement signal according to a brightness variation value of the first sensing signal.

In an embodiment, the second detection unit 14 generates the touch signal according to a brightness variation value of the second sensing signal. That is, the periodically turning on or turning off of the light source makes the brightness changes, and based on the brightness variation it is determined that whether there is a finger touch. Therefore, the brightness variation value is relative to a brightness value when turning on the light source and/or a brightness value when turning off the light source. In an embodiment, the brightness variation value is a differential value of a brightness value when turning on the light source and a brightness value when turning off the light source. In other words, when the light source is on, if a finger touches the optical mouse, the second sensor 13 will detect the light reflected from the finger and generate the second sensing signal, and if the finger does not touch the optical mouse, the second sensor 13 will not detect light reflected from the finger.

The controller 15 is used to output a control signal in response to the touch signal of the second detection unit 14, so that the first detection unit 12 operates at a dormant state or a sensing state in response to the control signal.

More particularly, if the second detection unit 14 detects the touch signal, the first detection unit 12 performs the detection and calculation of the displacement signal. On the other hand, if the second detection unit 14 does not detect the touch signal, the first detection unit 12 enters the dormant state without performing the displacement calculation. Furthermore, if the sensing module is used in the optical mouse, the whole computer system may use the control signal generated by the controller 25 to determine whether to enter a dormant state or a sensing state.

In a computer system, the standby state of the computer system refers to a state with the monitor and hardware turned off. In the standby state, the computer is not powered off and data on memory is not stored on the hardware. Once a user presses any key of the keyboard, the computer returns to the state before the standby mode. The dormant state of a computer system refers to a state with data stored on the hardware. In the dormant state, the computer is powered off When the computer is restarted, the data is read from the hardware and the computer returns to the state before the dormant state. However, a general mouse does not distinguish the standby state from the dormant state. That is, the dormant state may refer to the standby state, where the power supply to most modules is cut off but elements for sensing are stilled in power supply. In this case, electricity power can be saved. The dormant state (or standby state) is called as power-saving state. Of course, the sensing state refers to a normal operation state.

Figure 2:
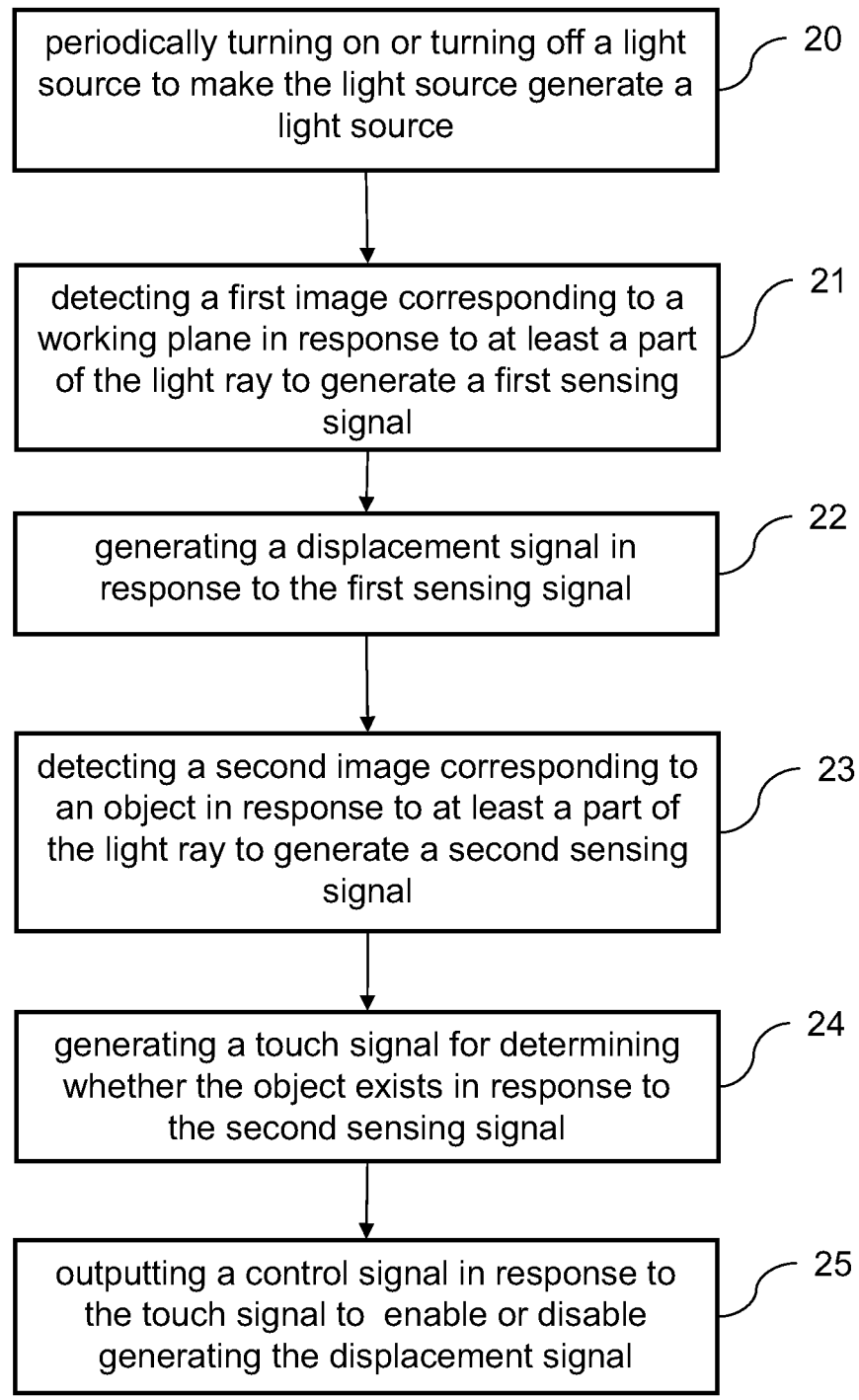
FIG. 2 is a power-saving sensing method for an optical mouse according to an embodiment of the disclosure.

FIG. 2 is a flowchart of a power-saving sensing method for an optical mouse according to an embodiment of the disclosure.

Firstly, a light source is periodically turned on or turned off to generate a light ray (step 20). Next, a first image corresponding to a working plane is detected in response to at least a part of the light ray so as to generate a first sensing signal (step 21). Next, a displacement signal is generated in response to the first sensing signal (step 22).

Next, a second image corresponding to an object is detected in response to at least a part of the light ray so as to generate a second sensing signal (step 23). Then, a touch signal for determining whether the object exists is generated in response to the second sensing signal (step 24). The object is often a user's finger. Actually, the object may be anything of which the operation may be sensed by the second sensor. The object for example may be a touch pen.

Finally, a control signal is outputted in response to the touch signal so as to enable or disable generating the displacement signal (step 25).

In an embodiment, the first detection unit 12 generates the displacement signal according to a feature value of the first sensing signal. In another embodiment, the first detection unit 12 generates the displacement signal according to a brightness variation value of the first sensing signal. The brightness variation value is relative to a brightness value when turning on the light source 10 and/or a brightness value when turning off the light source 10. In an embodiment, the brightness variation value is the differential value of a brightness value when turning on the light source and a brightness value when turning off the light source.

According to the above described embodiments, the sensing module may be used in an optical mouse, but the disclosure is not limited this way. Other peripheral devices having functions similar to those of a mouse can apply the sensing module of the disclosure. In other words, the sensing module of the present disclosure can be used in peripheral devices for controlling a screen cursor.

According to the power-saving sensing module and the power-saving sensing method according to the present disclosure, another sensor is used to detect whether an object touches the mouse so as to determine whether to output a displacement signal or enter a power-saving state. The power-saving sensing module does not merely reply on the displacement signal detection to determine whether to enter the power-saving state. Thus, the power-saving effect can be further enhanced by the present disclosure.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A power-saving sensing module for an optical mouse, the optical mouse having an upper surface and a lower surface, the power-saving sensing module comprising:
   a light source for providing a light ray;
   a first sensor for detecting a first image corresponding to a working plane in response to at least a part of the light ray to generate a first sensing signal, wherein the optical mouse operating on the working plane, and the lower surface of the optical mouse facing to the working plane;
   a first detection unit for generating a displacement signal in response to the first sensing signal;
   a second sensor for detecting a second image corresponding to an object in response to at least a part of the light ray to generate a second sensing signal;
   a second detection unit for generating a touch signal corresponding to the object in response to the second sensing signal; and
   a control unit for outputting a control signal in response to the touch signal of the second detection unit, so that the first detection unit operates at a dormant state or a sensing state in response to the control signal.

2. The module according to claim 1, wherein the object operates on the upper surface of the optical mouse.

3. The module according to claim 1, wherein the light source is a light-emitting diode or a laser diode.

4. The module according to claim 1, wherein the first sensor and/or the second sensor is an image sensor.

5. The module according to claim 1, wherein the object is a user's finger.

6. The module according to claim 1, further comprising a light source controller for periodically controlling turning on or turning off of the light source.

7. The module according to claim 1, wherein the first detection unit generates the displacement signal according to a feature value of the first sensing signal.

8. The module according to claim 1, wherein the first detection unit generates the displacement signal according to a brightness variation value of the first sensing signal.

9. The module according to claim 1, wherein the second detection unit generates the touch signal according to a brightness variation value of the second sensing signal.

10. The module according to claim 9, wherein the brightness variation value is relative to a brightness value when turning on the light source and/or a brightness value when turning off the light source.

11. The module according to claim 9, wherein the brightness variation value is a differential value of a brightness value when turning on the light source and a brightness value when turning off the light source.

12. A power-saving sensing method for an optical mouse, the method comprising:
   periodically turning on or turning off a light source to make the light source generate a light ray;
   detecting a first image corresponding to a working plane in response to at least a part of the light ray to generate a first sensing signal;
   generating a displacement signal in response to the first sensing signal;
   detecting a second image corresponding to an object in response to at least a part of the light ray to generate a second sensing signal;
   generating a touch signal corresponding to the object in response to the second sensing signal; and
   outputting a control signal in response to the touch signal to enable or disable generating the displacement signal.

13. The power-saving sensing method for an optical mouse according to claim 12, wherein the displacement signal is generated according to a feature value of the first sensing signal.

14. The power-saving sensing method for an optical mouse according to claim 12, wherein the displacement signal is generated according to a brightness variation value of the first sensing signal.

15. The power-saving sensing method for an optical mouse according to claim 12, wherein the touch signal is generated according to a brightness variation value of the second sensing signal.

16. The power-saving sensing method for an optical mouse according to claim 15, wherein the brightness variation value is relative to a brightness value when turning on the light source and/or a brightness value when turning off the light source.

17. The power-saving sensing method for an optical mouse according to claim 15, wherein the brightness variation value is a differential value of a brightness value when turning on the light source and a brightness value when turning off the light source.

* * * * *